March 9, 1965     B. STORSAND     3,173,061
COOLED SEMI-CONDUCTOR RECTIFIER ASSEMBLY Filed Sept. 1, 1961     2 Sheets-Sheet 1

INVENTOR:
BJARNE STORSAND
By Frederick Breitenfeld
ATTORNEY 3,173,061
COOLED SEMI-CONDUCTOR RECTIFIER ASSEMBLY
Bjarne Storsand, Watt, Zurich, Switzerland, assignor to Oerlikon Engineering Company, Zurich, Switzerland, a corporation of Switzerland
Filed Sept. 1, 1961, Ser. No. 146,028
Claims priority, application Switzerland, Sept. 8, 1960, 10,198/60
3 Claims. (Cl. 317—100)

My present invention relates to improvements in semi-conductor rectifier assemblies.

When using semi-conductor diodes in rectifier installations, it is difficult to attain uniform current distribution across the individual rectifier elements. To help attain uniform distribution in a semi-conductor rectifier arrangement known per se, the transformer windings are subdivided into a plurality of individual windings stacked along the core, each of which is connected to a rectifier bridge. The connecting lines extend through the transformer cover to a remote panel on which are accommodated the semi-conductor rectifiers. It was found, however, that on account of the differential stray reactances of the connecting conductors, the diode voltages were different so that the current distribution was non-uniform to a certain degree notwithstanding the subdivision of the windings. Even in the case of only small voltage differences, the rectifier currents may yet vary very considerably. As a result, some of the diodes may be carrying the rated current, while others are loaded with only a fraction thereof. In order to avoid overloads the lay-out must therefore be for a mean current load which is less than the rated load.

A further disadvantage of arrangements known per se is that they require a relatively large space and a substantial expenditure for construction. Said deficiencies and disadvantages are obviated, in accordance with the teachings of the invention, by disposing the semi-conductor rectifier elements as well as the appurtenant fuses and cooler means immediately along the rectifier-transformer casing walls.

Figure 1:
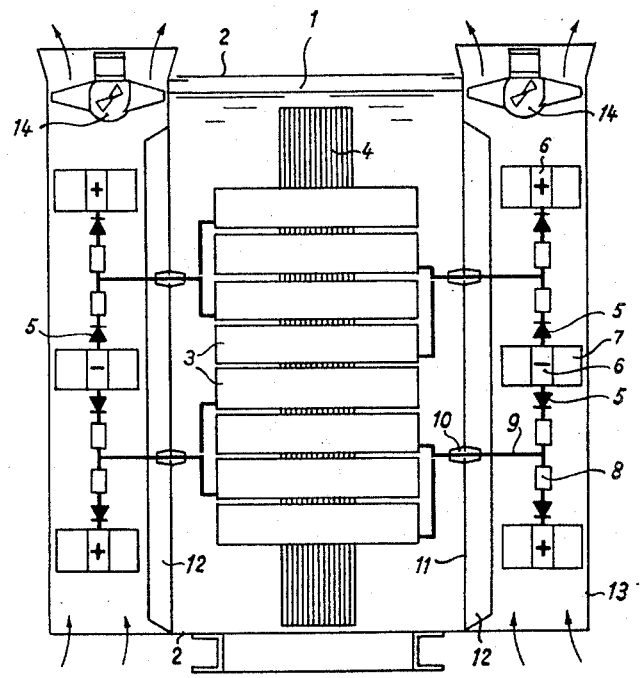
Figure 2:
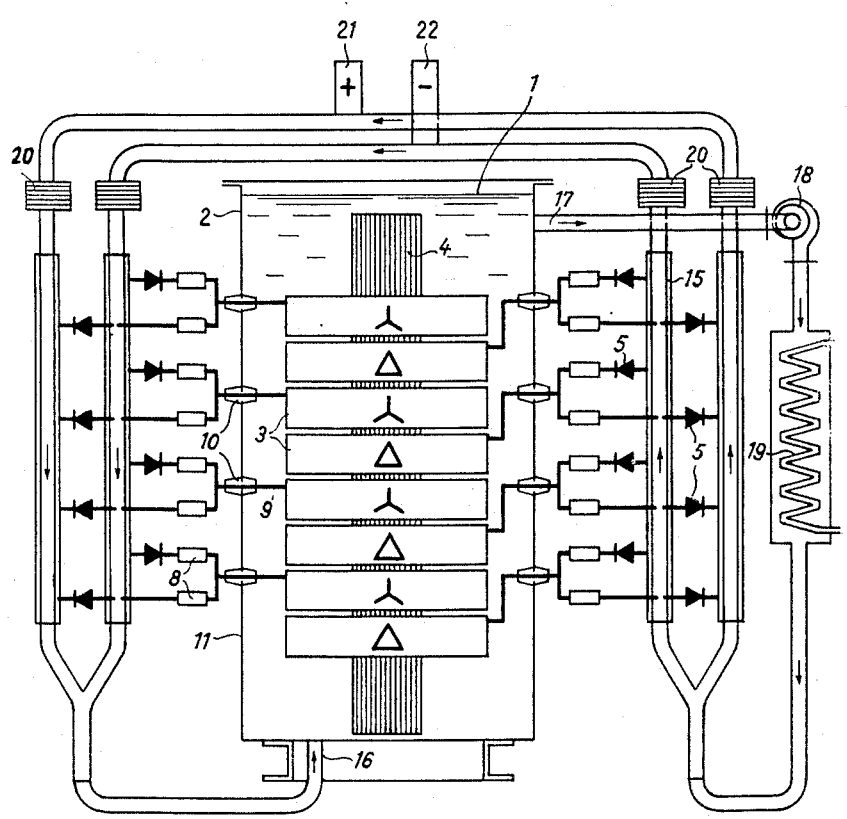

Two forms of the invention are schematically shown in FIGS. 1 and 2 of the drawing. In FIG. 1, cooling is effected by an airstream, and in FIG. 2 by a liquid coolant.

In FIG. 1, numeral 1 designates the entire transformer shown opened and in side view, for example a three-phase transformer, 2 the casing thereof, 3 the transformer windings which are subdivided along one of the cores 4, and 5 denotes the semi-conductor rectifiers. Since FIG. 1 is a side view, only one of the cores of the transformer is visible, but each core has a similar arrangement of windings and appurtenant rectifiers. Connectors 9 extend between the tiered separate transformer windings 3 and the rectifiers 5, and through bushings 10 in the longitudinal casing walls 11. The bushings 10 also serve as carriers for the fuses or circuit breakers 8 that precede the rectifiers 5. The rectifiers are screwed into cooler blocks 6 that are used as bus-bars and provided with cooling ribs 7. The coolant airstream is produced by a fan 14 in a duct formed by the external walls 13 and the casing walls 11. The cooling fins of the transformer casing are denoted by 12. The cooling surfaces of the cooler blocks 6 may have different dimensions in such manner that the mathematical product of cooling area times air velocity times $T_K - T_L$ (wherein $T_K$ is the invariable diode cooler block temperature and $T_L$ is the variable air temperature) remains constant.

In FIG. 2, like parts have the same reference signs as in FIG. 1. The diodes 5, however, are screwed into metallic tubes 15 that carry the transformer coolant that has been recooled with the aid of a cooler element 19. The coolant flows through a pipe 16 into the transformer and leaves through a pipe 17, a pump 18 returning it to the cooler element 19. Each transformer phase is associated with a positive and a negative bus-bar which are parallel to the transformer-core axis and are provided with a magnetically biased transducer core 20 serving for voltage regulation. The positive and negative terminals are denoted by 21 and 22 respectively.

The semi-conductor rectifier elements suitably are connected to the rectifier-transformer windings by conductors of equal length. For the assemblage of the conductors, openings are provided in the rectifier-transformer casing walls, that are closed by covers to which are secured transformer cooling ribs (not shown.)

By virtue of the arrangement disclosed by the present invention, the stray reactances of the conductors are substantially the same, whereby a uniform current distribution to the individual diodes is attained, thereby improving the efficiency of the rectifier assembly. A further advantage of the invention resides in the saving of a special cooling means for the rectifiers and finally there result a substantial space saving and a considerable decrease of the current-heat losses due to the short connections between transformer and diodes.

From FIGS. 1 and 2 may be seen that when using screw-threaded rectifiers, attention has to be paid to the forward direction with respect to the screw threads, and the polarity has to be chosen accordingly.

What I claim as new and desire to secure by Letters Patent, is:
1. A semi-conductor rectifier installation comprising:
   (a) a rectifier transformer having a core and a series of windings mounted on said core;
   (b) a casing completely enclosing said transformer, said casing being filled with a liquid coolant such as oil;
   (c) a circulatory circuit for said liquid including an inlet and an outlet pipe connected to said casing, a pump for circulating said liquid, a cooling element over which said liquid is passed, and metal pipes through which said liquid flows and arranged directly along the outer surface of the walls of said casing;
   (d) semi-conductor diodes fastened directly to said metal pipes;
   (e) electrical connections between said transformer windings within said casing and said diodes outside said casing, and
   (f) bushings in the walls of said casing for providing leak-tight passageways for said connections.
2. In a semi-conductor rectifier installation, the elements defined in claim 1 including a transducer core surrounding each of said metal pipes.
3. In a semi-conductor rectifier installation, the elements defined in claim 1 wherein said electrical connections are all of equal length.

References Cited by the Examiner

UNITED STATES PATENTS

| | | | |
|---|---|---|---|
| 2,189,909 | 2/40 | Korber et al. | 317—100 |
| 2,412,989 | 12/46 | Kotterman | 317—100 |
| 2,883,591 | 3/59 | Camp | 317—100 |
| 2,927,250 | 3/60 | Scherli | 317—100 |
| 2,974,263 | 3/61 | Akins | 317—100 |
| 2,980,828 | 4/61 | Eggers | 317—99 |
| 2,986,679 | 5/61 | Storstand | 317—100 |
| 3,011,105 | 11/61 | Le Blanc | 317—100 |
| 3,069,615 | 12/62 | Jensen | 174—15 |
| 3,136,924 | 6/64 | Futral et al. | 317—100 |

LARAMIE E. ASKIN, Primary Examiner.
JOHN F. BURNS, Examiner.